United States Patent
Matsumoto

(10) Patent No.: US 9,880,505 B2
(45) Date of Patent: Jan. 30, 2018

(54) SHEET FEEDING DEVICE

(71) Applicant: CANON KABUSHIKI KAISHA, Tokyo (JP)

(72) Inventor: Yasuaki Matsumoto, Susono (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/212,440

(22) Filed: Jul. 18, 2016

(65) Prior Publication Data
US 2017/0031295 A1 Feb. 2, 2017

(30) Foreign Application Priority Data
Jul. 31, 2015 (JP) ................................. 2015-151978

(51) Int. Cl.
| | | |
|---|---|---|
| *B65H 3/06* | (2006.01) | |
| *G03G 15/00* | (2006.01) | |
| *B65H 29/22* | (2006.01) | |
| *F16H 1/20* | (2006.01) | |

(52) U.S. Cl.
CPC ....... *G03G 15/6529* (2013.01); *B65H 3/0638* (2013.01); *B65H 3/0684* (2013.01); *B65H 29/22* (2013.01); *F16H 1/20* (2013.01); *B65H 2402/31* (2013.01); *B65H 2402/5152* (2013.01); *B65H 2407/20* (2013.01); *B65H 2601/324* (2013.01);
(Continued)

(58) Field of Classification Search
CPC ...... B65H 2402/515; B65H 2402/5152; B65H 2402/5153; B65H 2601/324; B65H 3/0638
See application file for complete search history.

(56) References Cited

U.S. PATENT DOCUMENTS

| | | |
|---|---|---|
| 5,535,012 A | 7/1996 | Matsumoto et al. |
| 5,580,045 A | 12/1996 | Matsumoto et al. |
| 6,021,305 A | 2/2000 | Sato et al. |

(Continued)

FOREIGN PATENT DOCUMENTS

| | | |
|---|---|---|
| CN | 1782901 A | 6/2006 |
| CN | 101003333 A | 7/2007 |

(Continued)

OTHER PUBLICATIONS

European Search Report issued in corresponding European Patent Application No. 16179402.9 dated Dec. 22, 2016.

(Continued)

*Primary Examiner* — Jeremy R Severson
(74) *Attorney, Agent, or Firm* — Fitzpatrick, Cella, Harper & Scinto

(57) ABSTRACT

A sheet feeding device includes: a main assembly; a holding unit detachably mountable to the main assembly; a portion-to-be-engaged provided on the main assembly; a rotatable member, provided in the holding unit, for feeding a sheet; and a guiding member for guiding feeding of the sheet. The guiding member is provided in the holding unit and includes an engaging portion engageable with the portion-to-be-engaged. The guiding member is movable between an engaging position where the portion-to-be-engaged and the engaging portion are engaged with each other to guide the sheet and a guiding position where the portion-to-be-engaged and the engaging portion are disengaged from each other to guide demounting and mounting of the holding unit.

24 Claims, 11 Drawing Sheets

(52) U.S. Cl.
CPC ...... *B65H 2801/06* (2013.01); *B65H 2801/12* (2013.01)

(56) References Cited

U.S. PATENT DOCUMENTS

| | | | |
|---|---|---|---|
| 6,131,898 | A | 10/2000 | Hiroi et al. |
| 6,246,491 | B1 | 6/2001 | Matsumoto et al. |
| 6,473,590 | B2 | 10/2002 | Matsumoto et al. |
| 6,904,261 | B2 | 6/2005 | Fujii et al. |
| 6,963,722 | B2 | 11/2005 | Matsumoto et al. |
| 7,007,948 | B2 | 3/2006 | Kamiya et al. |
| 7,095,978 | B2 | 8/2006 | Matsumoto et al. |
| 7,913,996 | B2 | 3/2011 | Nishikata et al. |
| 8,006,973 | B2 | 8/2011 | Toba et al. |
| 8,079,586 | B2 * | 12/2011 | Watanabe ............ B65H 3/0638 271/145 |
| 8,262,084 | B2 | 9/2012 | Nishikata et al. |
| 8,894,061 | B2 | 11/2014 | Matsuoka |
| 9,272,858 | B2 | 3/2016 | Hirose |
| 9,527,685 | B2 * | 12/2016 | Kawamura ......... B65H 3/0684 |
| 9,546,059 | B2 * | 1/2017 | Ohta .................... B65H 3/5215 |
| 9,695,000 | B2 * | 7/2017 | Mizuguchi ........... B65H 3/5261 |
| 9,708,142 | B2 * | 7/2017 | Ohta .................... B65H 3/5215 |
| 2007/0145666 | A1 | 6/2007 | Nishikata et al. |
| 2009/0072469 | A1 * | 3/2009 | Toba .................... G03G 15/602 271/10.11 |
| 2009/0267293 | A1 | 10/2009 | Watanabe et al. |
| 2009/0295069 | A1 * | 12/2009 | Shiina ................ G03G 15/6511 271/126 |
| 2011/0140355 | A1 | 6/2011 | Nishikata et al. |
| 2012/0223476 | A1 * | 9/2012 | Nakayama .......... B65H 3/0653 271/274 |
| 2013/0136517 | A1 | 5/2013 | Hirose |
| 2013/0334762 | A1 | 12/2013 | Matsuoka |

FOREIGN PATENT DOCUMENTS

| | | |
|---|---|---|
| CN | 101387837 A | 3/2009 |
| CN | 103135386 A | 6/2013 |
| CN | 103508223 A | 1/2014 |
| JP | 2004-256287 A | 9/2004 |
| JP | 2005-320132 A | 11/2005 |
| JP | 4330487 B2 | 9/2009 |

OTHER PUBLICATIONS

Dec. 4, 2017 Chinese Official Action in Chinese Patent Appln. No. 201610616194.7.

* cited by examiner

US 9,880,505 B2

SHEET FEEDING DEVICE

FIELD OF THE INVENTION AND RELATED ART

The present invention relates to a sheet feeding device which includes a rotatable member unit for feeding a sheet and which is used in an image forming apparatus.

Conventionally, in an image forming apparatus of an electrophotographic type or the like, a constitution in which a sheet is fed (carried) to an image forming portion and an image is formed on the sheet has become widespread. Further, as such an image forming apparatus, an image forming apparatus in which a sheet stacking tray is detachably mounted in an apparatus main assembly and sheets accommodated in the sheet stacking tray are automatically fed to the image forming portion is generally used.

A sheet feeding device used in such an image forming apparatus is provided with a feeding roller and a separation roller. The transfer and the separation roller feed the sheet by using friction between peripheral surfaces thereof and a surface of the sheet stacked on the sheet stacking tray. Then, by this friction, the surfaces of the rollers are abraded little by little, and therefore, there is a need to periodically replace the rollers. Accordingly, Japanese Laid-Open Patent Application (JP-A) 2004-256287 has proposed a sheet feeding device constituted so that a feeding roller can be replaced by a user are a service person.

In the sheet feeding device in JP-A 2004-256287, when the feeding roller is demounted, the user first slides (moves) a rotation shaft on which the feeding roller is mounted in an axial direction relative to a bearing, so that one end portion of the rotation shaft is made demountable from the bearing. Then, the user swings the rotation shaft about the other end portion of the rotation shaft as a supporting point, so that the one end portion of the rotation shaft is demounted from the bearing and then the feeding roller is demounted from the other end portion side of the rotation shaft.

However, the feeding roller in JP-A 2004-256287 was disposed at a rear (deep) position of the sheet feeding device in many cases, and therefore, it was difficult to perform an operation for demounting the feeding roller. That is, in order to slide (move) the rotation shaft on which the feeding roller was mounted and then to swing the rotation shaft, the user was required to put his (her) hand(s) in the deep position of the sheet feeding device, so that a maintenance property was poor. Further, the user directly held a rubber portion of the feeding roller frequently and operated the feeding roller in some cases when the rotation shaft was slid and swung, so that there was a liability that a feeding performance of the feeding roller was lowered.

SUMMARY OF THE INVENTION

According to an aspect of the present invention, there is provided a sheet feeding device comprising: a main assembly; a holding unit detachably mountable to the main assembly; a portion to be engaged provided on the main assembly; a rotatable member, provided in the holding unit, for feeding a sheet; and a guiding member for guiding feeding of the sheet, wherein the guiding member is provided in the holding unit and includes an engaging portion engageable with the portion to be engaged, wherein the guiding member is movable between an engaging position where the portion to be engaged and the engaging portion are engaged with each other to guide the sheet and a guiding position where the portion to be engaged and the engaging portion are disengaged from each other to guide demounting and mounting of the holding unit.

Further features of the present invention will become apparent from the following description of exemplary embodiments with reference to the attached drawings.

DESCRIPTION OF THE EMBODIMENTS

First Embodiment

[General Structure]

Figure 1:
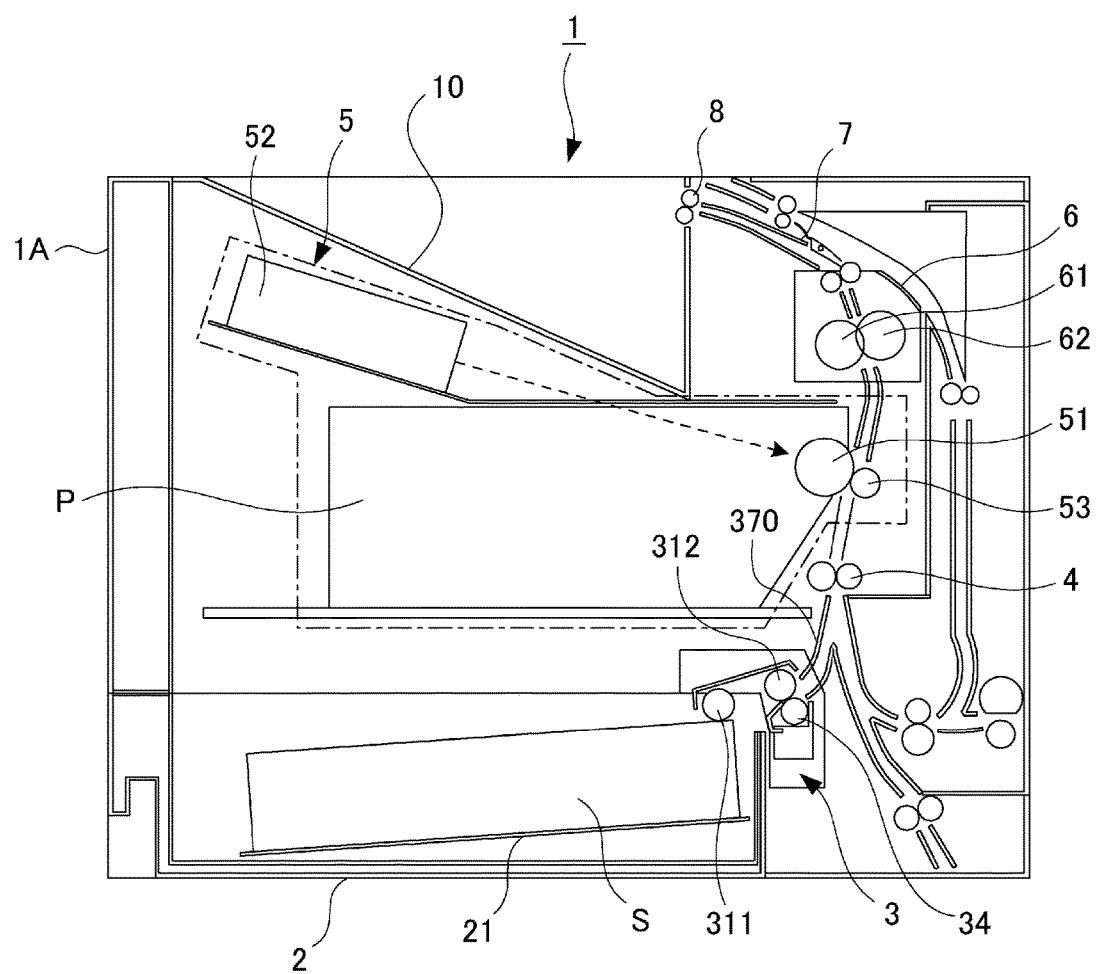
FIG. 1 is a schematic general view showing a printer in First Embodiment of the present invention.

First Embodiment of the present invention will be described. A printer (image forming apparatus) 1 in this embodiment is a laser beam printer of an electrophotographic type. The printer 1 includes, as shown in FIG. 1, an apparatus main assembly 1A including an image forming portion 5 and a fixing portion 6, a cassette 2 (stacking unit) provided so as to be mountable to and demountable (pullable) from the apparatus main assembly 1A, and a carrying unit for carrying a sheet stacked in the cassette 2. In this embodiment, the printer 1 itself also functions as a sheet feeding (carrying) device for feeding (carrying) the sheet. In this embodiment, the carrying unit is a feeding unit 3 including a feeding roller for feeding the sheet in contact with the stacked sheet.

In the cassette 2, a lift-up plate 21 (stacking member) on which sheets S are stacked is supported so as to be capable of being raised and lowered, and the sheets S stacked on the lift-up plate 21 are sequentially fed (sent) from the cassette 2 from an uppermost sheet by a feeding roller 311 rotating in the counterclockwise direction. The sheets S fed by the feeding roller 311 are separated one by one by a carrying roller 312 and a separation roller 34, and the separated sheet S is carried to a carrying roller pair 4. Then, the sheet S is carried to the image forming portion 5 (image forming unit) by the carrying roller pair 4.

Here, the image forming portion 5 is of a cartridge type in which a photosensitive drum 51 and a laser scanner 52 for irradiating the photosensitive drum 51 with laser light are integrally assembled into a process cartridge P (unit) and the process cartridge P is detachably mountable to the apparatus main assembly A. In the image forming portion 5, the photosensitive drum 51 rotating in the counterclockwise direction is irradiated with the laser light depending on image information by the laser scanner 52. As a result, an electrostatic latent image is formed on the photosensitive drum 51 and thereafter is developed with a toner at a developing portion (not shown) in the process cartridge P.

The sheet S fed to the image forming portion 5 is fed to the fixing portion 6 after the toner image is transferred as an unfixed image from the photosensitive drum 51 onto the sheet S by applying a bias (voltage) to a transfer roller 53. The fixing portion 6 forms a fixing nip by a heating unit 61 constituted by a fixing film and a ceramic heater or the like provided inside the fixing film, and a pressing roller 62 press-contacting the heating unit 61. The unfixed image on the sheet S is to be fixed on the sheet S by being passed through the fixing nip. Then, the sheet S passes through a sheet discharging path 7 and then is discharged to an outside of the printer through a discharging roller pair 8, and thus is stacked on a discharge tray 10.

In this embodiment, as an image forming process performed by the image forming portion for forming an image on the sheet S, an electrophotographic image forming process using a transfer portion and the fixing portion is employed, but the present invention is not limited thereto. For example, the present invention may also employ an ink jet image forming process in which the image is formed on the sheet by ejecting an ink liquid through a nozzle.

[Feeding Unit]

Figure 2:
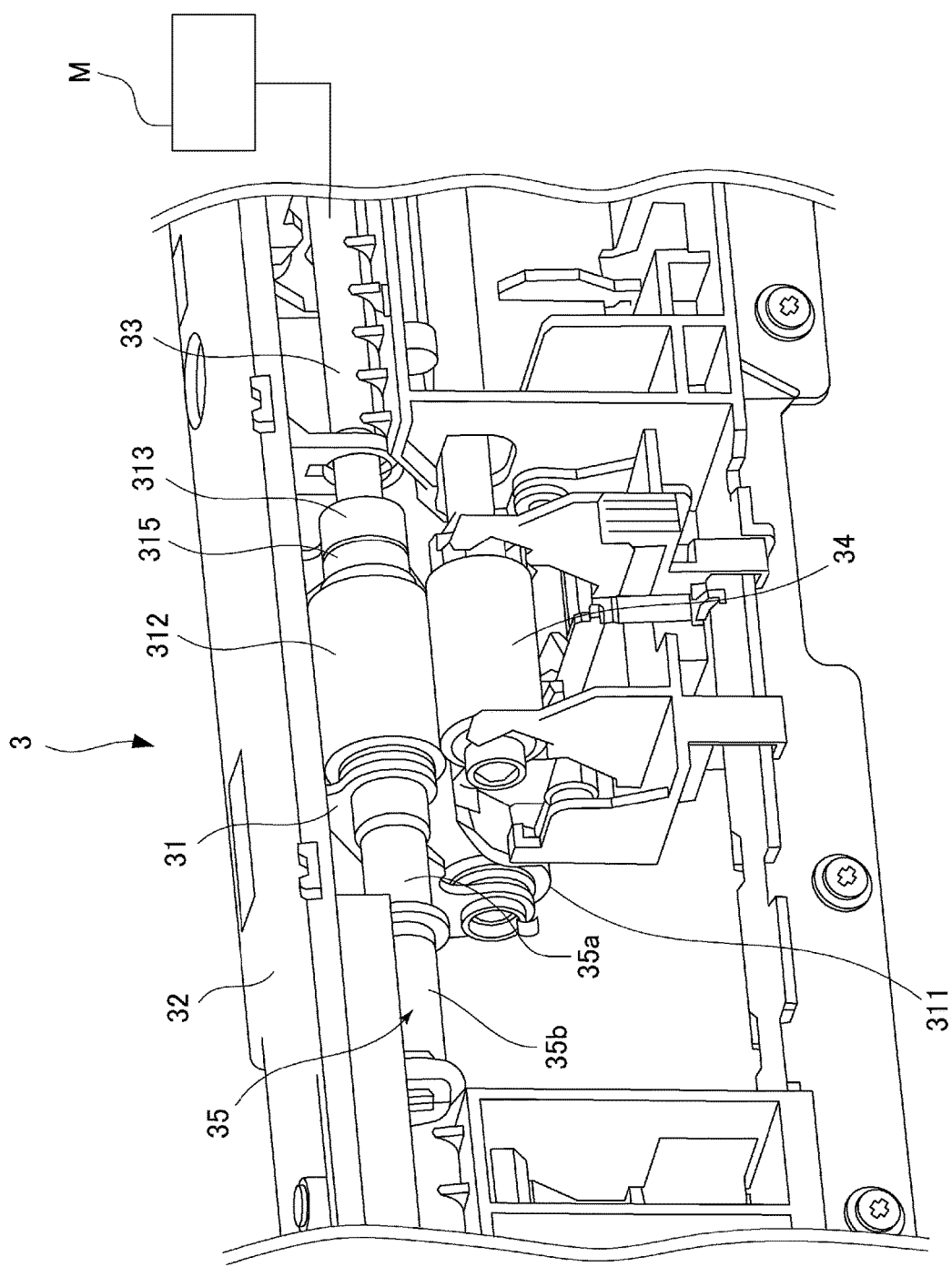
FIG. 2 is a perspective view showing a feeding unit.

A detailed structure of the feeding unit 3 will be described. As shown in FIG. 2, the feeding unit 3 includes a coupling shaft 33 (connecting shaft) which is supported by a feeding frame 32 and which is driven by a motor M (driving source), a feeding roller unit 31 (holding unit), the separation roller 34 and a sliding shaft 35. Further, the feeding unit 3 includes a sheet detecting device 318 (FIG. 4) for detecting the sheet S stacked on the lift-up plate 21.

The feeding roller unit 31 includes a roller holder 313 supported swingably and detachably mountably by the coupling shaft 33, and the feeding roller 311 and the carrying roller 312 which are rotatably supported by the roller holder 313. The feeding roller 311 and the carrying roller 312 are rotatable members.

Figure 3:
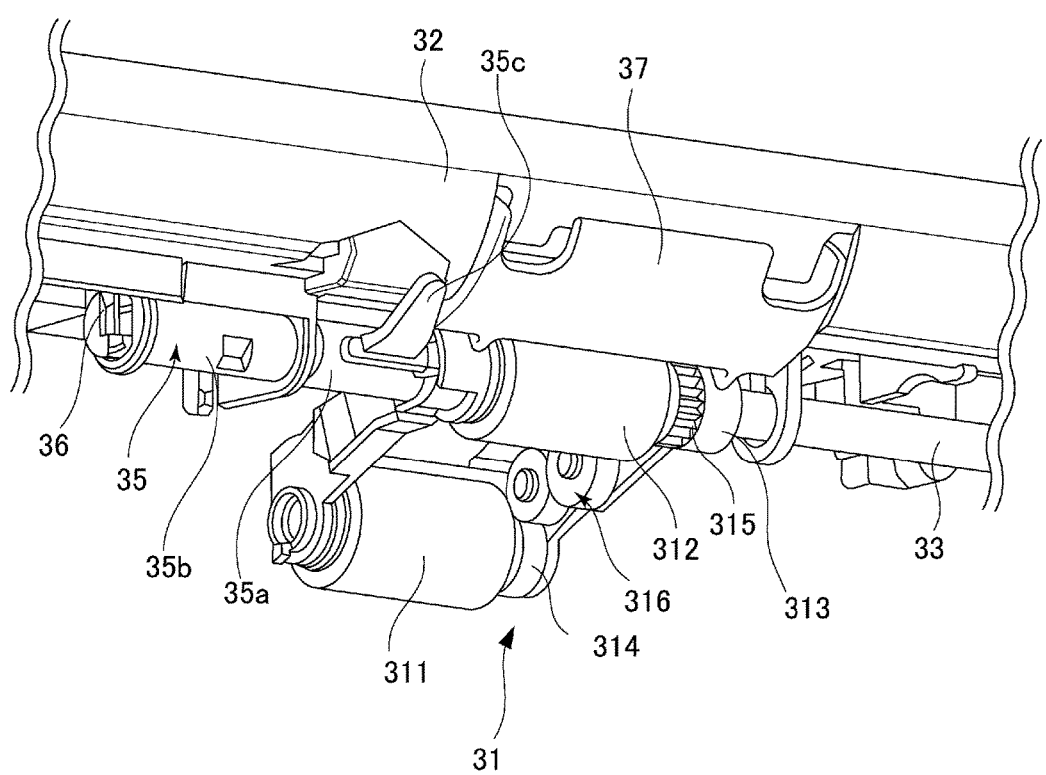
FIG. 3 is a perspective view showing a feeding roller unit and a grip guide.

Further, the feeding roller unit 31 includes a grip guide 37 (FIG. 3) which is described later and which is a guiding member. An outer peripheral surface of each of the feeding roller 311 and the carrying roller 312 is formed of a rubber. As shown in FIG. 3, a feeding gear 314 is provided coaxially with the feeding roller 311, and a carrying gar 315 is provided coaxially with the carrying roller 312.

The carrying roller 312 and the carrying gear 315 are disposed coaxially with the coupling shaft 33 and the sliding shaft 35, and the coupling shaft 33 is spline-engaged with the carrying gear 315. The sliding shaft 35 includes a shaft tube (barrel) 35b fixed to the feeding frame 32, a shaft portion 35a which is provided slidably with the shaft tube 35b with respect to an axial direction and which swingably supports the roller holder 313, and an urging spring 36 provided compressedly between the shaft tube 35b and the shaft portion 35a. The shaft portion 35a (moving shaft) is constituted so as to be engageable with an end portion of the roller holder 313 in an opposite side from a side where the coupling shaft 33 is connected. An urging force of the urging spring 36 (urging means) is set to such an extent that the feeding roller unit 31 is not disconnected in an unintended situation (during feeding, during jam clearance or during drop). Further, the shaft portion 35a is provided with a grip portion 35c so that the user or the service person (hereinafter simply referred to as a user) can easily move the shaft portion 35a against the urging force of the urging spring 36.

Figure 4:
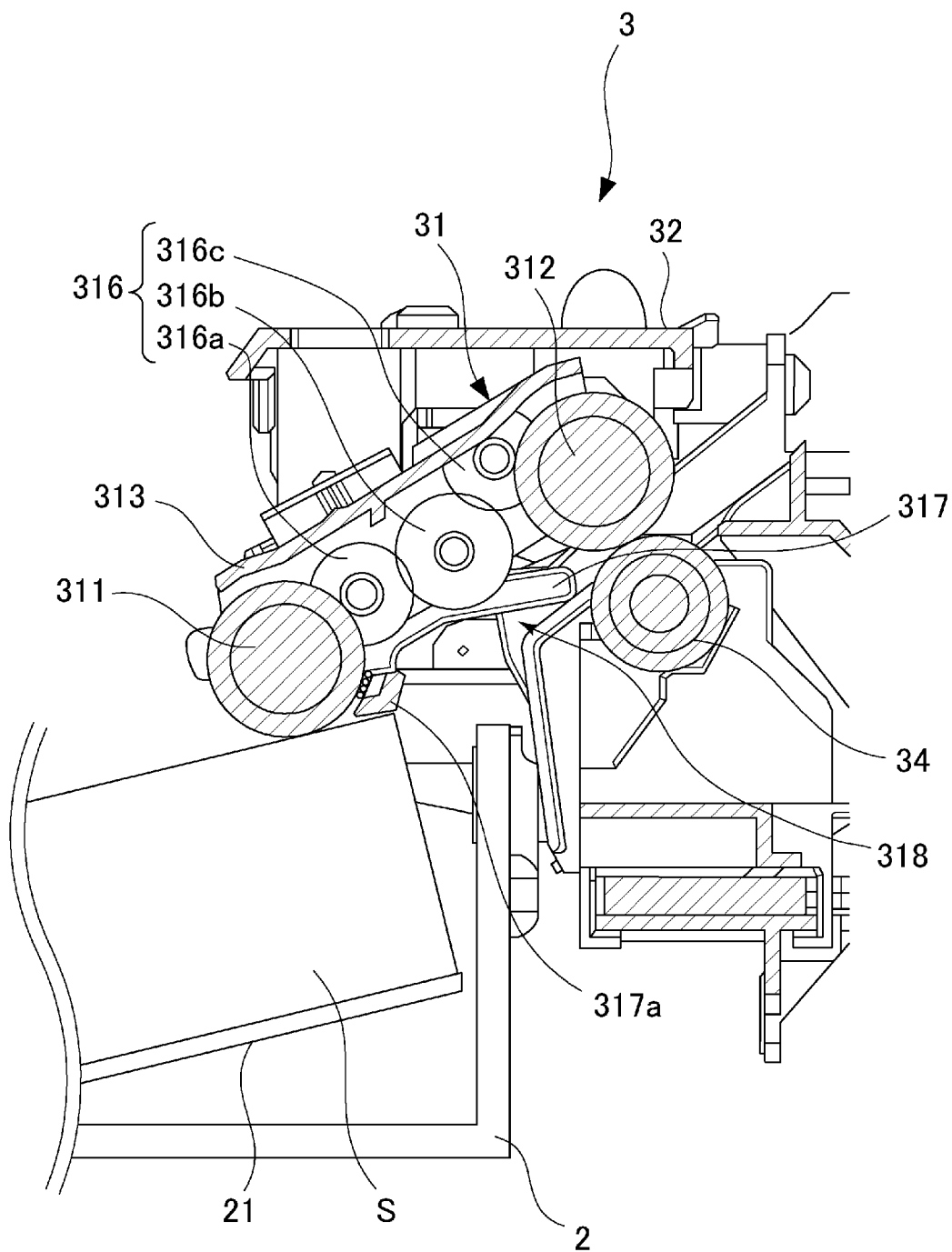
FIG. 4 is a sectional side view of the feeding roller unit.

Between the carrying gear 315 and the feeding gear 314, as shown in FIGS. 3 and 4, a transmitting gear portion 316 constituted by a plurality of gears 316a, 316b and 316c and is supported rotatably by the roller holder 313. That is, a driving force of the motor M is transmitted to the carrying gear 315 and the carrying roller 312 via the coupling shaft 33. The driving force of the carrying gear 315 is transmitted to the feeding guide 314 and the feeding roller 311 via the transmitting gear portion 316.

The grip guide 37 (guiding member) is supported rotatably (relatively movably) by the roller holder 313 and is retained by the roller holder 313 with respect to an axial direction of the carrying roller 312. That is, the grip guide 37 is integrally mounted to the feeding roller unit 31. Further, the grip guide 37 is held (supported) by the feeding frame 32 which is a part of the apparatus main assembly 1A.

Figure 6:
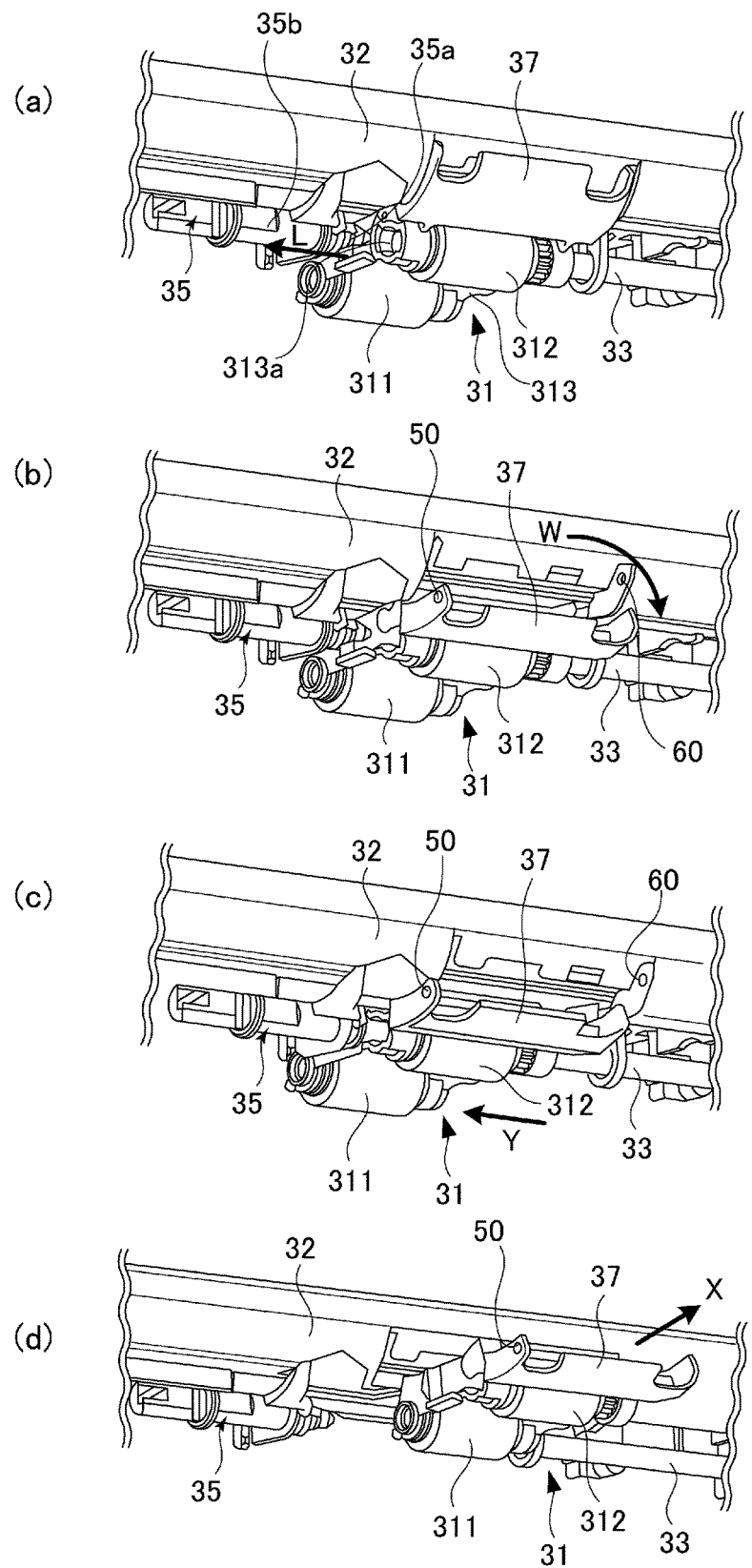
In FIG. 6, (a) to (d) are perspective views for illustrating a demount of the feeding roller unit, wherein (a) is the perspective view showing a state in which a shaft portion is demounted from the feeding roller unit, (b) is the perspective view showing a state in which the grip guide is demounted from a feeding frame, (c) is the perspective view showing a state in which the feeding roller unit is moved in an axial direction, and (d) is the perspective view showing a state in which the feeding roller unit is demounted from an apparatus main assembly.

Specifically, the grip guide 37 and the feeding frame 32 are formed of a resin material. The grip guide 37 is provided with a projected portion 50 (engaging portion), and the feeding frame 32 is provided with a recessed portion 60 (portion-to-be-engaged) (FIG. 6). By engagement between the projected portion 50 and the recessed portion 60, the grip guide 37 is held by the feeding frame 32. Further, using elasticity of the resin material, the grip guide 37 can be easily demounted from the feeding frame. That is, a snap-fitting constitution is employed. Thus, the grip guide 37 is constituted so as to be movably relative to the carrying roller 312 between an engaging position where the recessed portion 60 and the projected portion 50 are engaged with each other and a moved position where the grip guide 37 is moved from the engaging position. Here, the moved position is a guiding position when the recessed portion 60 and the projected portion 50 are disengaged from each other and then the feeding roller unit 31 is demounted from the apparatus main assembly 1A.

Incidentally, the material of the grip guide 37 and the feeding frame 32 is not limited to the resin material, but may also be another material such as metal. Further, a holding constitution of the grip guide 37 is not limited to the snap-fitting constitution, but may also be another constitution.

The grip guide 37 extends to a side downstream of the carrying roller 312 with respect to a sheet feeding direction, and guides the fed sheet S toward the side downstream of the carrying roller 312 with respect to the sheet feeding direction at the engaging position where the grip guide 37 is held by the feeding frame 32. That is, the grip guide 37 constitutes a part of a feeding guide 370 (FIG. 1) provided between the carrying roller 312 and the carrying roller pair 4.

[Lift-Up Control]

The sheet detecting device 318 includes a first sheet detecting member 317 supported rotatably about an axis coaxial with a rotation shaft (axis) of the feeding roller 311 and an unshown second sheet detecting member rotated by being pushed by the first sheet detecting member. When the lift-up plate 21 is raised by a driving force of an unshown motor, the sheet S stacked on the lift-up plate 21 is contacted to a sheet contacting portion 317a provided at one end portion of the first sheet detecting member 317.

When the lift-up plate 21 is further raised and the first sheet detecting member 317 is rotated, the unshown second sheet detecting member is rotated by being pushed by the first sheet detecting member 317. When the second sheet detecting member is rotated by a predetermined angle, the second sheet detecting member is detected by an unshown sensor, and the motor for driving the lift-up plate 21 is stopped by an unshown controller.

That is, the sheet S stacked on the lift-up plate 21 is fed by the feeding roller 311 rotated by the motor M. The sheet S fed by the feeding roller 311 is separated one by one by the carrying roller 312 and the separation roller 34 and is carried to the carrying roller pair 4. When the number of sheets S stacked on the lift-up plate 21 decreases, the feeding roller 311 and the first sheet detecting member 317 gradually move downwardly.

Then, when the sheets S in a certain number of sheets are fed and the second sheet detecting member moves to a position where the second sheet detecting member is not detected by the sensor, the lift-up plate 21 is raised again until the second sheet detecting member moves to a position where the second sheet detecting member can be detected by the sensor. That is, the sheet detecting device 318 detects a height of the sheet(s) S stacked on the lift-up plate 2. As a result, the height of the sheet(s) S stacked on the lift-up plate 21 is controlled so as to always fall within a certain range.

Incidentally, the sheet contact portion 317a of the first sheet detecting member 317 is provided at a central portion with respect to the axial direction of the feeding roller 311. That is, the sheet contacting portion 317a is provided in a region where the feeding roller 311 contacts the sheet S with respect to the axial direction of the roller 311. This is because in the case where the sheet S curls, a position of the feeding roller 311 is properly determined. Further, the sheet contact portion 317a is provided downstream of a position where the feeding roller 311 contacts the sheet S and upstream of a position where the carrying roller 312 contacts the sheet S with respect to the sheet feeding direction. This is because even when an angle of an uppermost surface of the sheet(s) S varies depending on a stacking amount of the sheet(s) S stacked on the lift-up plate 21, a degree of a change in position where the sheet S abuts against the carrying roller 312 is minimized.

Thus, when the sheets S are fed repeatedly by the feeding roller 311, each of the feeding roller 311, the carrying roller 312 and the separation roller 34 is gradually abraded (worn). At the same time, also the sheet contact portion 317a of the first sheet detecting member 317 is gradually abraded. In this embodiment, a width of the sheet contact portion 317a is made smaller than a width of the feeding roller 311 so that a positional relation between the sheet contact portion 317a and the feeding roller 311 is unchanged even when abrasion of the feeding roller 311 progresses.

[Mounting and Demounting Method of Feeding Roller Unit]

Figure 5:
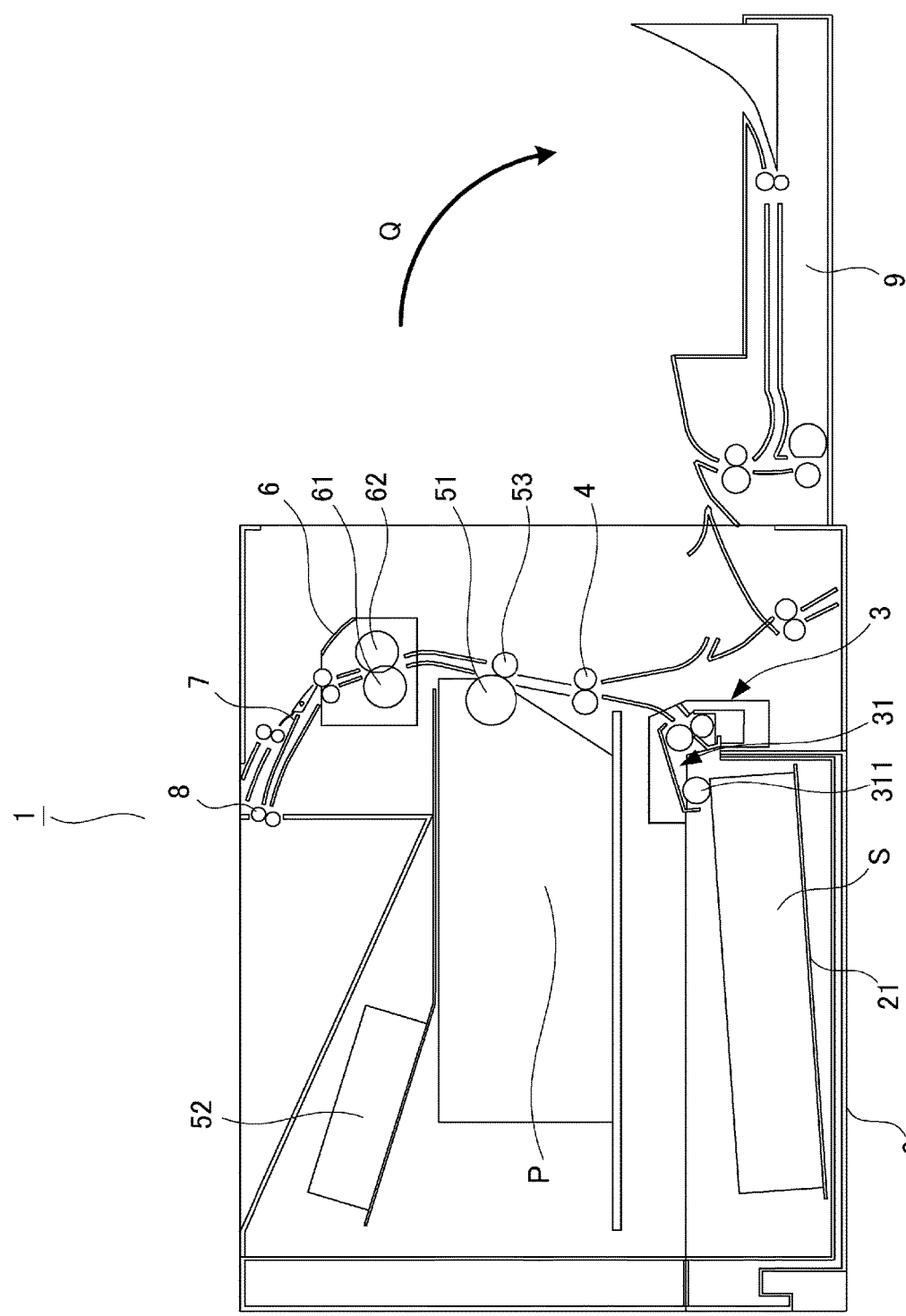
FIG. 5 is a schematic general view showing an open state of an access door of the printer.

A mounting and demounting method for mounting and demounting the feeding roller unit 31 relative to the apparatus main assembly 1A will be described. When the feeding roller unit 31 is replaced (exchanged), as shown in FIG. 5, the user first opens an access door 9, which is openably provided to the apparatus main assembly 1A, for performing jam clearance. By opening the access door 9 in an arrow Q direction, the feeding roller unit 31 mounted to the feeding unit 3 can be observed with eyes of the user.

Then, as shown in (a) of FIG. 6, the user moves the shaft portion 35a of the sliding shaft 35 in an axial direction (arrow L direction) against an urging force of the urging spring 36. As a result, the shaft portion 35a is disconnected from a mounting hole 313a of the roller holder 313. Then, the user rotates, as shown in (b) of FIG. 6, the grip guide 37 held by the feeding frame 32 from the engaging position to the moved position in an arrow W direction, and thus demounts the grip guide 37 from the feeding frame 32.

In this state, the user can grip the grip guide 37 and as shown in (c) of FIG. 6, in a state in which the user grips the grip guide 37, the user moves the feeding roller unit 31 integrally connected with the grip guide 37 in an arrow Y direction and thus demounts the feeding roller unit 31 from the coupling shaft 33. That is, the grip guide 37 also functions as a grip member to be gripped by the user. Finally, as shown in (d) of FIG. 6, the user can demount the feeding roller unit 31 from the apparatus main assembly 1A by pulling the grip guide 37 to an outside (in an arrow X direction) of the apparatus main assembly 1A.

As shown in (d) of FIG. 6, when the feeding roller unit 31 is demounted from the apparatus main assembly 1A, the grip guide 37 is positioned in a foremost side of the feeding roller unit 31.

At this time, the feeding roller 311, the carrying roller 312 and the sheet detecting device 318 are integrally assembled as the feeding roller unit 31, and therefore after the feeding roller unit 31 is demounted, it becomes possible to replace the feeding roller 311, the carrying roller 312 and the sheet detecting device 318. Further, when a fresh (new) feeding roller unit 31 is mounted, an operation reverse to the above-described demounting operation of the feeding roller unit 31 may only be required to be performed.

Figure 11:
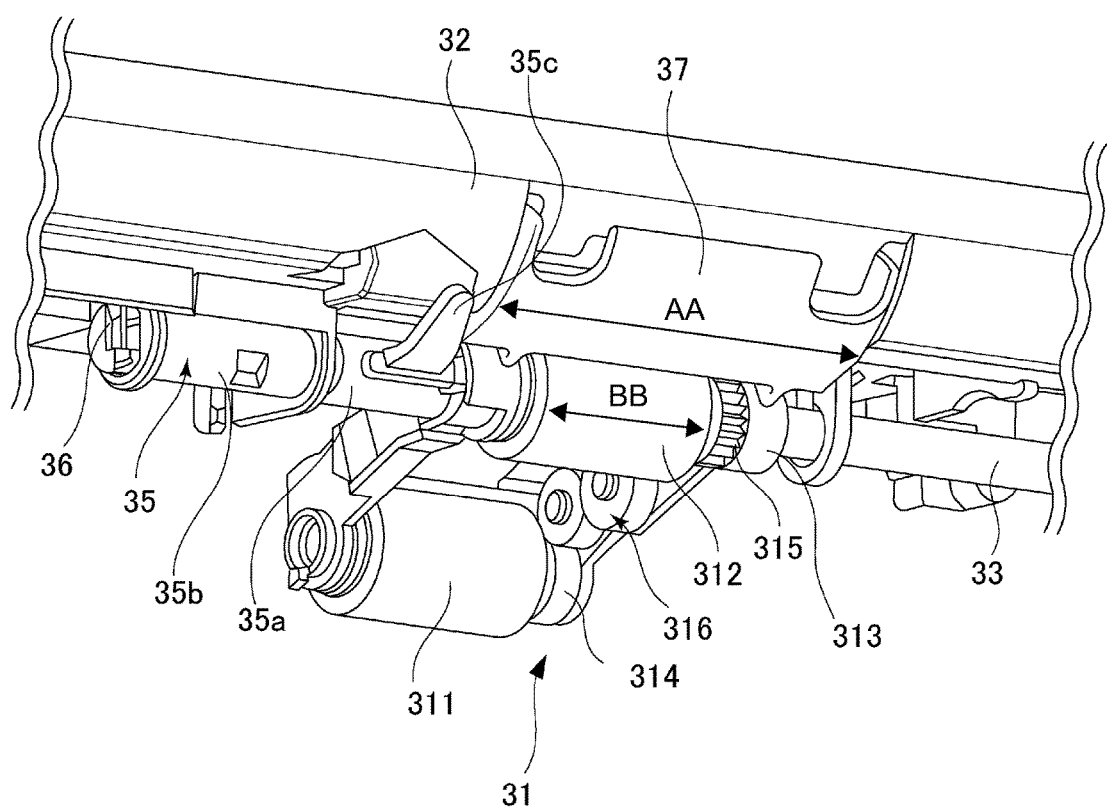
FIG. 11 is a perspective view for comparing sizes between the grip guide and the feeding roller with respect to a widthwise direction perpendicular to a feeding direction of a sheet by the feeding roller.

As described above, in this embodiment, by providing the grip guide 37, it is possible to grip the feeding roller unit 31 having a grip portion small in number with reliability, so that the maintenance property can be improved. Further, the user can mount and demount the feeding roller unit 31 without directly touching the feeding roller 311 and the carrying roller 312 which have outer peripheral surfaces formed of the rubber, and therefore it is possible to prevent a lowering in feeding performance due to touch of the outer peripheral surfaces of the feeding roller 311 and the carrying roller 312 by the user. As one of the reasons therefor, as shown in FIG. 11, with respect to the widthwise direction perpendicular to the feeding direction of the sheet by the feeding roller 311 and the carrying roller 312, the grip guide 37 is larger than the feeding roller 311 and the carrying roller 312.

Further, when the feeding roller unit 31 is mounted, the grip guide 37 is mounted to the feeding frame 32, so that the grip guide 37 functions as a member for temporarily holding the feeding roller unit 31 until the sliding shaft 35 engages with the feeding roller unit 31. In a state in which the feeding roller unit 31 is mounted to the feeding unit 3, the grip guide 37 is held by the feeding frame 32 and constitutes a part of the carrying guide 370, and therefore there is no need to ensure a new space as a grip member for gripping the feeding roller unit 31.

Further, in this embodiment, there are a plurality of members to be replaced (exchanged), and therefore the members are replaced integrally as the feeding roller unit 31, so that it is possible to omit a complicated operation such as demounting of peripheral parts for individual replacement (exchange). As a result, it is possible to improve a replacement (exchange) property of the feeding roller 311, the carrying roller 312 and the first sheet detecting member 317.

Incidentally, in this embodiment, the feeding roller unit 31 was described as the member to be replaced, but the present invention is not limited thereto. That is, a grip guide may also be provided so as to facilitate the replacement of a member including another rotatable member such as the carrying roller pair 4 or the discharging roller pair 8.

Further, in this embodiment, the grip guide 37 was provided demountably from the feeding frame 32, but the present invention is not limited thereto. That is, the grip guide 37 may also be constituted so as to be capable of being held (supported) by any of members of the apparatus main assembly 1A without being held by the feeding frame 32.

Second Embodiment

Second Embodiment of the present invention will be described, but is constituted so that only the feeding roller, not the feeding roller unit can be replaced. Therefore, constituent elements similar to those in First Embodiment will be omitted from illustration in the figures or described by using the same reference numerals or symbols in the figures.

Figure 7:
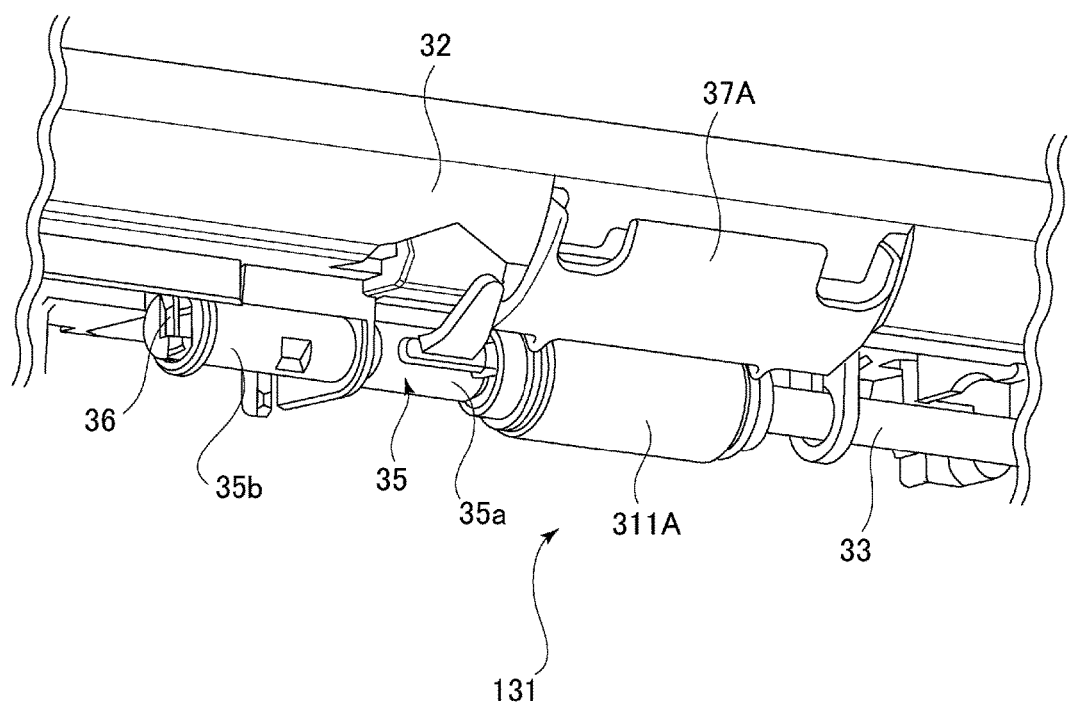
FIG. 7 is a perspective view showing a feeding roller and a grip guide in Second Embodiment of the present invention.

A feeding roller unit 131 (rotatable member unit) is constituted so as to be mountable to and demountable from the apparatus main assembly 1A as shown in FIG. 7. The feeding roller unit 131 includes a feeding roller 311A and a grip guide 37A. The feeding roller 311A for feeding the sheet S stacked on the lift-up plate 21 is rotatably supported by the coupling shaft 33 and the shaft portion 35a of the sliding shaft 35 urged by the urging spring 36. The grip guide 37A (guiding portion) is swingably supported by the feeding roller 311A (rotatable carrying member, carrying roller) and is supported by the feeding frame 32 so as to be demountable from the feeding frame 32. That is, the grip guide 37A is constituted so as to be movably relative to the feeding roller 311A between an engaging position where the recessed portion 60 of the feeding frame 32 and the projected portion 50 are engaged with each other and a moved position where the grip guide 37 is moved from the engaging position.

The grip guide 37A extends to a side downstream of the feeding roller 311A with respect to a sheet feeding direction, and guides the fed sheet S toward the side downstream of the carrying roller 312 with respect to the sheet feeding direction in a state in which the grip guide 37A is positioned at the engaging position where the grip guide 37 is held by the feeding frame 32. That is, the grip guide 37A constitutes a part of a feeding guide provided downstream of the carrying roller 311A with respect to the feeding direction.

[Mounting and Demounting Method of Feeding Roller]

A mounting and demounting method for mounting and demounting the feeding roller 311A relative to the apparatus main assembly 1A will be described. When the feeding roller 311A is replaced, the user first opens an access door 9 similarly as in First Embodiment (FIG. 5). Then, as shown in (a) of FIG. 8, the user moves the shaft portion 35a of the sliding shaft 35 in an axial direction (arrow L direction) against an urging force of the urging spring 36. As a result, the shaft portion 35a is disconnected from a mounting hole 111 of the feeding roller 311A. Then, the user rotates, as shown in (b) of FIG. 8, the grip guide 37A held by the feeding frame 32 from the engaging position to the moved position in an arrow W direction, and thus demounts the grip guide 37A from the feeding frame 32.

Figure 8:
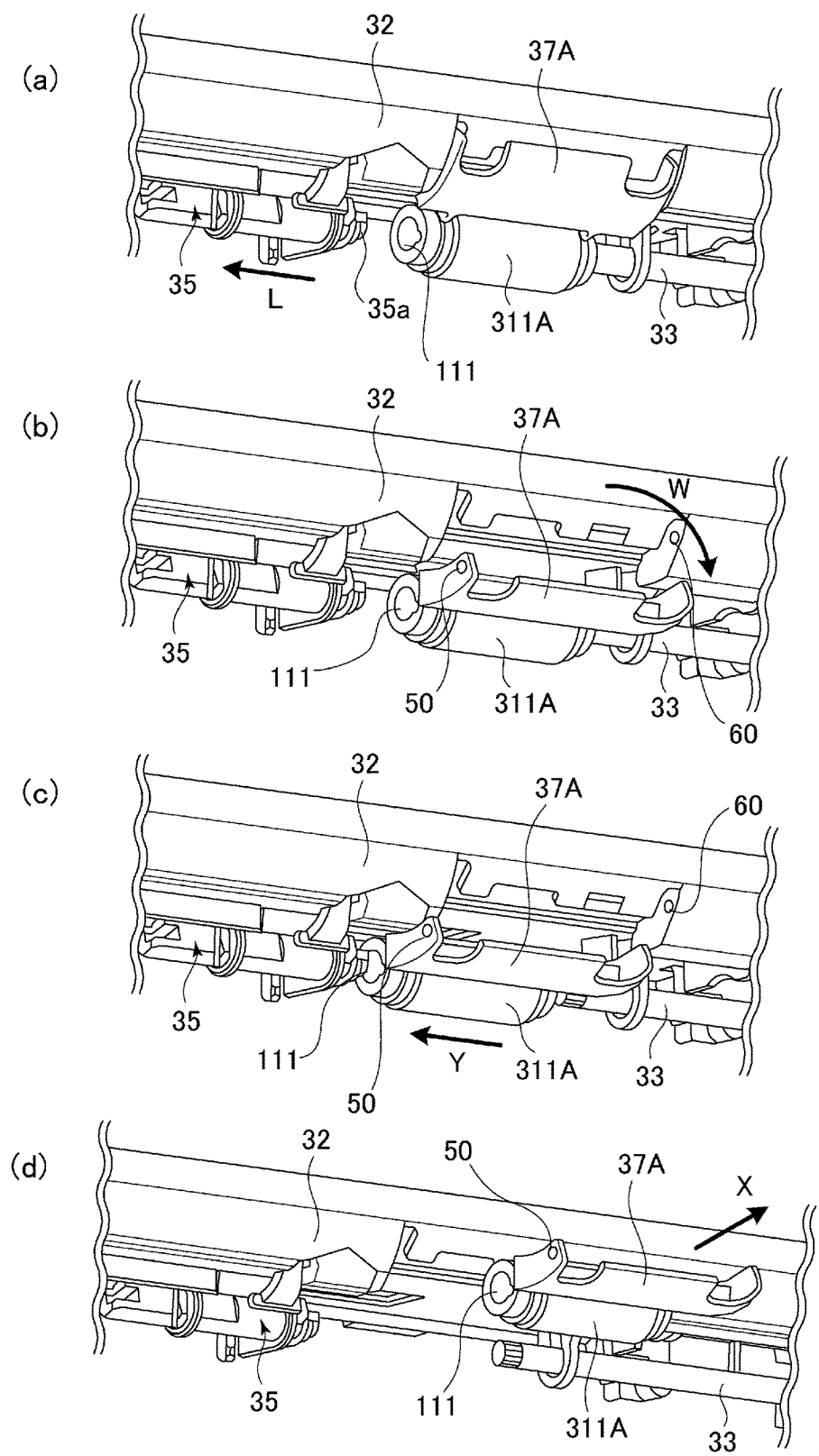
In FIG. 8, (a) to (d) are perspective views for illustrating a demount of the feeding roller unit, wherein (a) is the perspective view showing a state in which a shaft portion is demounted from the feeding roller unit, (b) is the perspective view showing a state in which the grip guide is demounted from a feeding frame, (c) is the perspective view showing a state in which the feeding roller is moved in an axial direction, and (d) is the perspective view showing a state in which the feeding roller is demounted from an apparatus main assembly.

In this state, the user can grip the grip guide 37A and as shown in (c) of FIG. 8, in a state in which the user grips the grip guide 37A, the user moves the feeding roller 311A integrally connected with the grip guide 37A in an arrow Y direction and thus demounts the feeding roller 311A from the coupling shaft 33. Finally, as shown in (d) of FIG. 8, the user can demount the feeding roller 311A from the apparatus main assembly 1A by pulling the grip guide 37A to an outside (in an arrow X direction) of the apparatus main assembly 1A. Further, when a fresh (new) feeding roller 311A is mounted, an operation reverse to the above-described demounting operation of the feeding roller 311A may only be required to be performed.

As described above, in this embodiment, by providing the grip guide 37A, it is possible to grip the feeding roller 311A having a grip portion small in number with reliability, so that the maintenance property can be improved. Further, the user can mount and demount the feeding roller 311A without directly touching the feeding roller 311A having an outer peripheral surface formed of the rubber, and therefore it is possible to prevent a lowering in feeding performance due to touch of the outer peripheral surfaces of the feeding roller 311A by the user.

Further, when the feeding roller 311A is mounted, the grip guide 37A is mounted to the feeding frame 32, so that the grip guide 37A functions as a member for temporarily holding the feeding roller 311A until the sliding shaft 35 engages with the feeding roller 311A. In a state in which the feeding roller 311A is mounted to the feeding unit 3, the grip guide 37A is held by the feeding frame 32 and constitutes a part of the carrying guide, and therefore there is no need to ensure a new space as a grip member for gripping the feeding roller 311A.

Incidentally, in this embodiment, the feeding roller 311A was constituted so as to be replaceable, but the present invention is not limited thereto. That is, the grip guide may also be constituted so as to be replaceable by being mounted to the carrying roller or the separation roller contacting the carrying roller, or the like roller as in this embodiment.

Third Embodiment

Third Embodiment of the present invention will be described, but is constituted so that the separation roller can be replaced. Therefore, constituent elements similar to those in First Embodiment will be omitted from illustration in the figures or described by using the same reference numerals or symbols in the figures.

Figure 9:
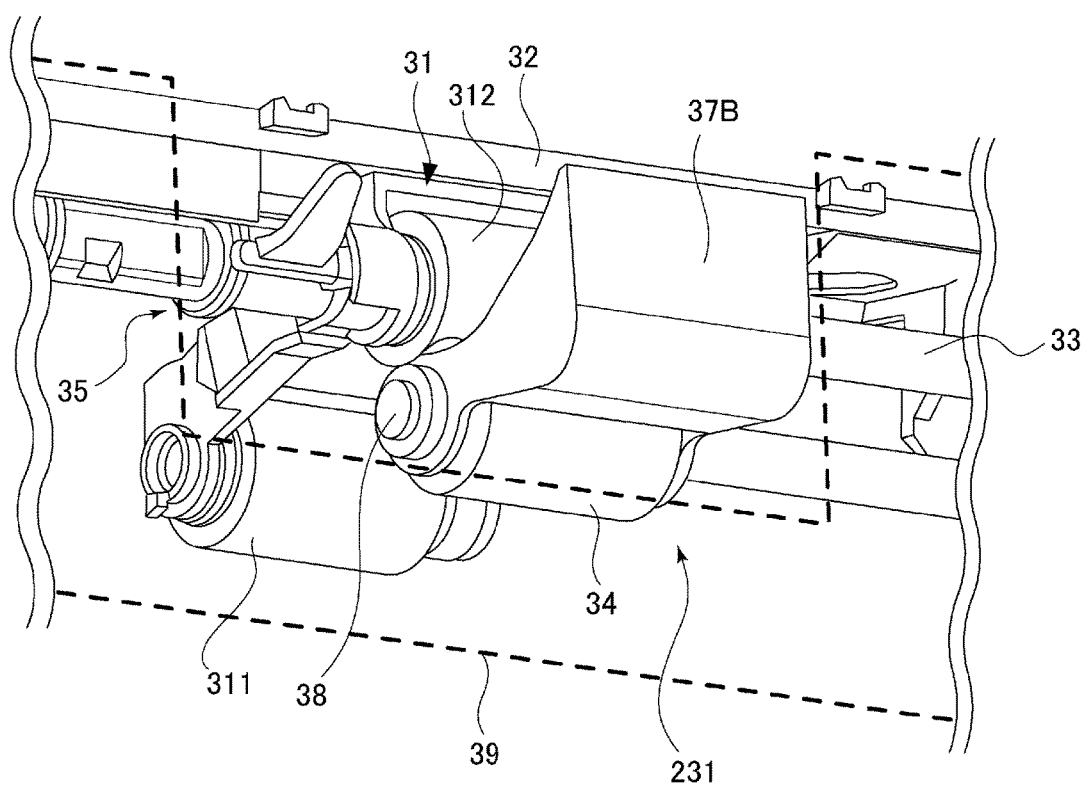
FIG. 9 is a perspective view showing a separation roller and a grip guide in Third Embodiment of the present invention.

A separation roller unit 231 (rotatable member unit) is constituted so as to be mountable to and demountable from the apparatus main assembly 1A as shown in FIG. 9. The separation roller unit 231 includes the separation roller 34 and a grip guide 37B. The separation roller 34 has an outer peripheral surface formed of the rubber and contacts the carrying roller 312, so that a nip is formed. Further, the separation roller 34 is rotatably supported by a separation roller shaft 38, and an unshown torque limiter is provided between the separation roller shaft 38 and the separation roller 34. Further, when the separation roller 34 directly contacts the carrying roller 312 or only one sheet is interposed between the separation roller 34 and the carrying roller 312, a torque capacity of the separation roller 34 exceeds a predetermined torque capacity, and thus rotates together with the carrying roller 312. Further, when the feeding roller 311 (rotatable feeding member) causes double feed of the sheets and thus two or more sheets are interposed between the separation roller 34 and the carrying roller 312, the separation roller 34 is at rest as it is and then separates the sheets one by one.

Incidentally, in this embodiment, a driving force is not inputted into the separation roller shaft 38, but may also be inputted into the separation roller shaft 38 in an opposite direction to the sheet feeding direction.

A grip guide 37B (guiding portion) is swingably supported by the separation roller 34 (rotatable separation member). Further, the grip guide 37B is supported demountably by a carrying guide 39 (indicated by a broken line in FIG. 9) which is a part of the apparatus main assembly 1A provided in a feeding path of the sheet fed from a sheet feeding device provided as an option at a lower-stage portion of the image forming apparatus. That is, the grip guide 37B is constituted so as to be movable relative to the separation roller 34 between an engaging position where an unshown recessed portion of the carrying guide 39 and an unshown projected portion of the grip guide 37B are engaged with each other and a moved position where the grip guide 37B is moved from the engaging position. Further, in a state in which the grip guide 37B is placed in the engaging position where the grip guide 37B is held by the carrying guide 39, the grip guide 37B guides the sheet in cooperation with the carrying guide 39.

[Mounting and Demounting Method of Separation Roller]

A mounting and demounting method for mounting and demounting the separation roller 34 relative to the apparatus main assembly 1A will be described. When the separation roller 34 is replaced, the user first opens an access door 9 similarly as in First Embodiment (FIG. 5). Then, the user rotates, as shown in (a) of FIG. 10, the grip guide 37B held by the carrying guide 39 from the engaging position to the moved position in an arrow W direction, and thus demounts the grip guide 37B from the carrying guide 39.

Figure 10:
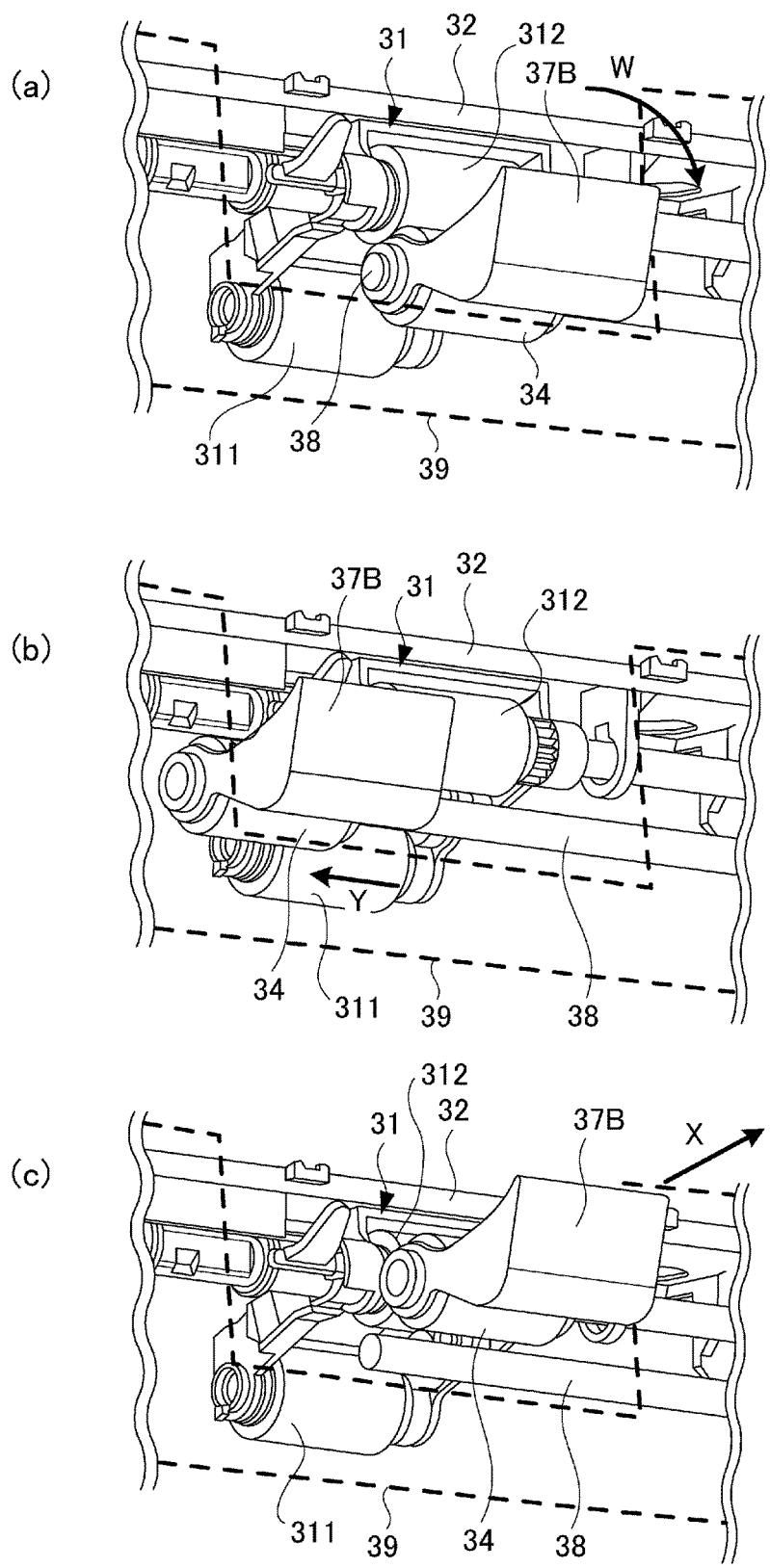
In FIG. 10, (a) to (c) are perspective views for illustrating a demount of the separation roller, wherein (a) is the perspective view showing a state in which the grip guide is demounted from a feeding guide, (b) is the perspective view showing a state in which the separation roller is moved in an axial direction, and (c) is the perspective view showing a state in which the separation roller is demounted from an apparatus main assembly.

In this state, the user can grip the grip guide 37B and as shown in (b) of FIG. 10, in a state in which the user grips the grip guide 37B, the user moves the separation roller 34 integrally connected with the grip guide 37B in an arrow Y direction and thus demounts the separation roller 34 from the separation roller shaft 38. Finally, as shown in (c) of FIG. 10, the user can demount the separation roller 34 from the apparatus main assembly 1A by pulling the grip guide 37B to an outside (in an arrow X direction) of the apparatus main assembly 1A. Further, when a fresh (new) separation roller 34 is mounted, an operation reverse to the above-described demounting operation of the separation roller 34 may only be required to be performed.

As described above, in this embodiment, by providing the grip guide 37B, it is possible to grip the separation roller 34 having a grip portion small in number with reliability, so that the maintenance property can be improved. Further, the user can mount and demount the separation roller 34 without directly touching the separation roller 34 having an outer peripheral surface formed of the rubber, and therefore it is possible to prevent a lowering in feeding performance due to touch of the outer peripheral surfaces of the separation roller 34 by the user.

In a state in which the separation roller 34 is mounted to the feeding unit 3, the grip guide 37B is held by the carrying guide 39 and can guide the sheet in cooperation with the carrying guide 39, and therefore there is no need to ensure a new space as a grip member for gripping the separation roller 34.

Incidentally, in the above-described First to Third Embodiments, each of the feeding roller 311, the carrying roller 312 and the separation roller 34 was the roller, but the present invention is not limited thereto. That is, the rollers may also be replaced with belts or the like.

In the above-described First to Third Embodiments, the grip guides were held (supported) by the feeding frame or the carrying guide, but may also be held by another fixing member.

According to the present invention, for example, when the rotatable carrying member such as the carrying roller is replaced, the rotatable member unit can be easily mounted and demounted by gripping the guiding portion placed in the moved position, so that a maintenance property can be improved. Further, during the replacing operation of the rotatable carrying member, the direct touch of the rotatable carrying member by the user is prevented, so that it is possible to prevent a lowering in carrying performance of the rotatable carrying member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-151978 filed on Jul. 31, 2015, which is hereby incorporated by reference herein in its entirety.

What is claimed is:

1. A sheet feeding device comprising:
   a main assembly;
   a holding unit detachably mountable to said main assembly;
   a portion-to-be-engaged provided on said main assembly;
   a rotatable member, provided in said holding unit, for feeding a sheet;
   a guiding member for guiding feeding of the sheet, wherein said guiding member is provided in said holding unit and includes an engaging portion engageable with said portion-to-be-engaged; and
   a connecting shaft which is supported by the main assembly and which is connected with said holding unit,
      wherein said guiding member is movable between an engaging position where said portion-to-be-engaged and the engaging portion are engaged with each other to guide the sheet and a guiding position where said portion-to-be-engaged and the engaging portion are disengaged from each other to guide demounting and mounting of said holding unit.

2. A sheet feeding device according to claim 1, wherein said guiding member is positioned in a foremost side of said holding unit with respect to a demounting direction of said holding unit in a state in which said guiding member is the guiding position.

3. A sheet feeding device according to claim 2, wherein said guiding member also functions as a gripping member to be held by a unit.

4. A sheet feeding device according to claim 1,
   wherein said rotatable member is connectable with the main assembly, and wherein when said holding unit is demounted from the main assembly, a connected state between said rotatable member and the main assembly is eliminated after said guiding member is moved from the engaging position to the guiding position.

5. A sheet feeding device according to claim 1, wherein said guiding member is larger than said rotatable member with respect to a widthwise direction perpendicular to a feeding direction of the sheet by said rotatable member.

6. A sheet feeding device according to claim 1, wherein said holding unit is demounted from or mounted to said connecting shaft by gripping of said guiding member in a state in which said guiding member is in the guiding position.

7. A sheet feeding device according to claim 1, wherein said rotatable member is a carrying roller, provided coaxially with said connecting shaft, for carrying the sheet.

8. A sheet feeding device according to claim 7, further comprising a driving source for driving said connecting shaft,
wherein said carrying roller is driven by said connecting shaft in a state in which said holding unit is connected with said connecting shaft.

9. A sheet feeding device according to claim 7, further comprising
a stacking unit including a stacking member on which the sheet is stacked,
wherein said holding unit includes a feeding roller for feeding the sheet toward said carrying roller and a holder which rotatably supports said carrying roller and said feeding roller and which is supported by said connecting shaft so as to be detachably mountable to said connecting shaft, and
wherein said guiding member is supported by said holder so as to be movable relative to said holder.

10. A sheet feeding device according to claim 9, wherein said holding unit includes a transmitting gear portion which transmits a driving force of said carrying roller driven by said driving source to said feeding roller and which is rotatably supported by said holder.

11. A sheet feeding device according to claim 9, wherein said holding unit includes a sheet detecting device for detecting a height of the sheet in contact with the sheet stacked on said stacking member.

12. A sheet feeding device according to claim 1, further comprising:
a moving shaft which is engageable with an end portion of said holding unit in a side opposite from a side where said connecting shaft is connected and which is movable in an axial direction of said rotatable member; and
urging means for urging said moving shaft toward said holding unit so as to engage said moving shaft with said holding unit.

13. A sheet feeding device according to claim 1, wherein said guiding member extends toward a downstream side of said rotatable member with respect to a sheet feeding direction and guides the sheet to the downstream side.

14. A sheet feeding device according to claim 1, further comprising an image forming unit for forming an image on the sheet fed by said rotatable member.

15. A sheet feeding device comprising:
a main assembly;
a holding unit detachably mountable to said main assembly;
a portion-to-be-engaged provided on said main assembly;
a rotatable member, provided in said holding unit, for feeding a sheet;
a roller holder, provided in said holding unit, for holding said rotatable member, and
a guiding member movable relative to said roller holder between an engaging position where said guiding portion guides the sheet and a guiding position where said guiding portion guides mounting and demounting of said holding unit.

16. A sheet feeding device according to claim 15,
wherein said guiding member includes an engaging portion engageable with said portion-to-be-engaged, and
wherein said guiding member is movable between the engaging position where said portion-to-be-engaged and the engaging portion are engaged with each other to guide the sheet and the guiding position where said portion-to-be-engaged and the engaging portion are disengaged from each other to guide demounting and mounting of said holding unit.

17. A sheet feeding device according to claim 16, wherein said guiding member is positioned in a foremost side of said holding unit with respect to a demounting direction of said holding unit in a state in which said guiding member is in the guiding position.

18. A sheet feeding device according to claim 15, wherein said guiding member also functions as a gripping member to be held by a unit.

19. A sheet feeding device according to claim 15, wherein said rotatable member is connectable with the main assembly, and
wherein when said holding unit is demounted from the main assembly, a connected state between said rotatable member and the main assembly is eliminated after said guiding member is moved from the engaging position to the guiding position.

20. A sheet feeding device according to claim 15, further comprising a connecting shaft which is supported by the main assembly and which is connected with said holding unit.

21. A sheet feeding device according to claim 20, wherein said rotatable member is a carrying roller, provided coaxially with said connecting shaft, for carrying the sheet.

22. A sheet feeding device according to claim 21, further comprising a driving source for driving said connecting shaft,
wherein said carrying roller is driven by said connecting shaft in a state in which said holding unit is connected with said connecting shaft.

23. A sheet feeding device according to claim 21, further comprising a stacking unit including a stacking member on which the sheet is stacked,
wherein said holding unit includes a feeding roller for feeding the sheet toward said carrying roller and a holder which rotatably supports said carrying roller and said feeding roller and which is supported by said connecting shaft so as to be detachably mountable to said connecting shaft, and
wherein said guiding member is supported by said holder so as to be movable relative to said holder.

24. A sheet feeding device according to claim 15, further comprising an image forming unit for forming an image on the sheet fed by said rotatable member.

* * * * *